Figure 1:
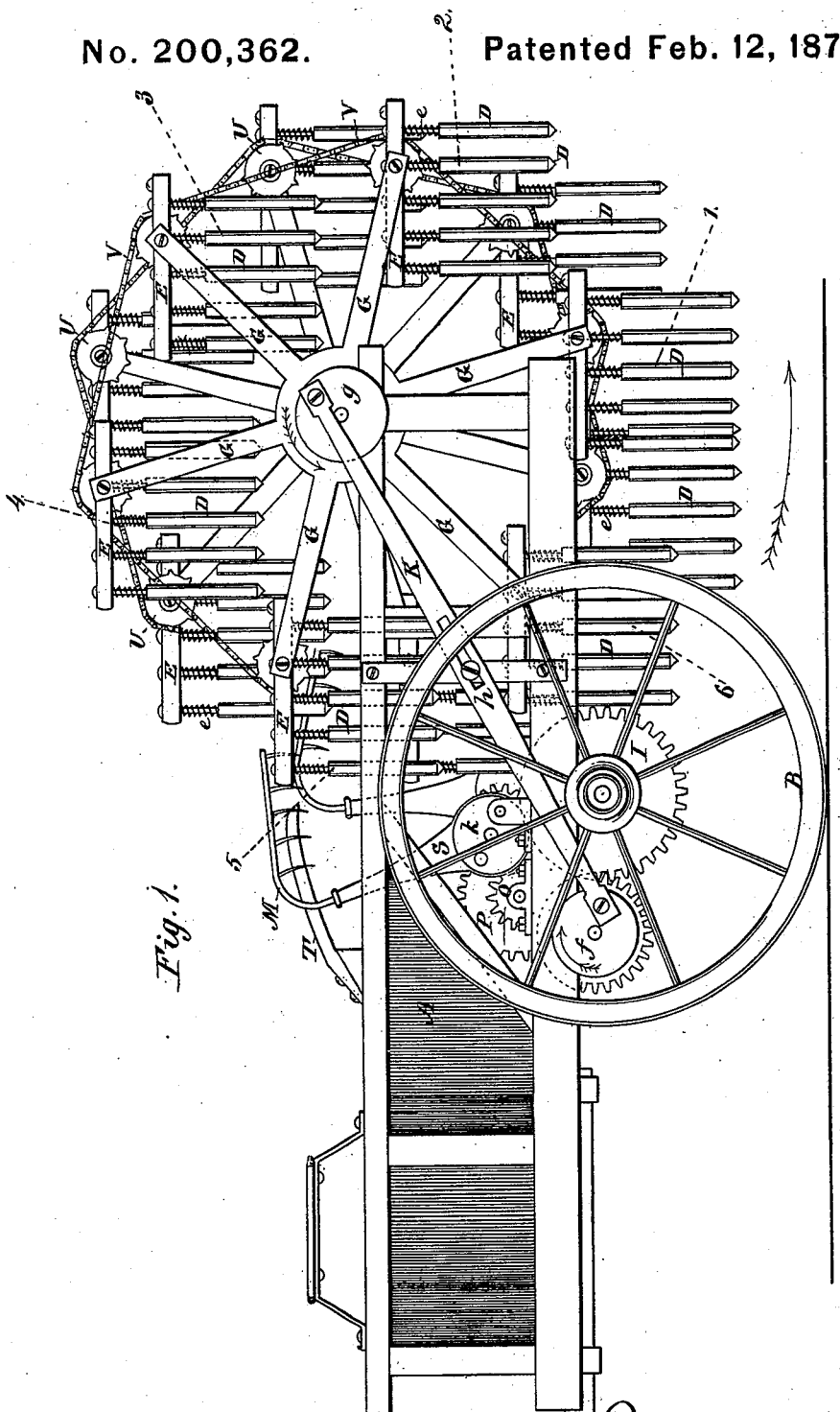

3 Sheets—Sheet 1.

J. TRIPP.
Cotton-Harvester.

No. 200,362. Patented Feb. 12, 1878.

WITNESSES:
W. W. Hollingsworth
Edw. W. Byrn

INVENTOR:
James Tripp
BY
ATTORNEYS.

N. PETERS, PHOTO-LITHOGRAPHER, WASHINGTON, D. C.

3 Sheets—Sheet 2.
J. TRIPP.
Cotton-Harvester.
No. 200,362. Patented Feb. 12, 1878.
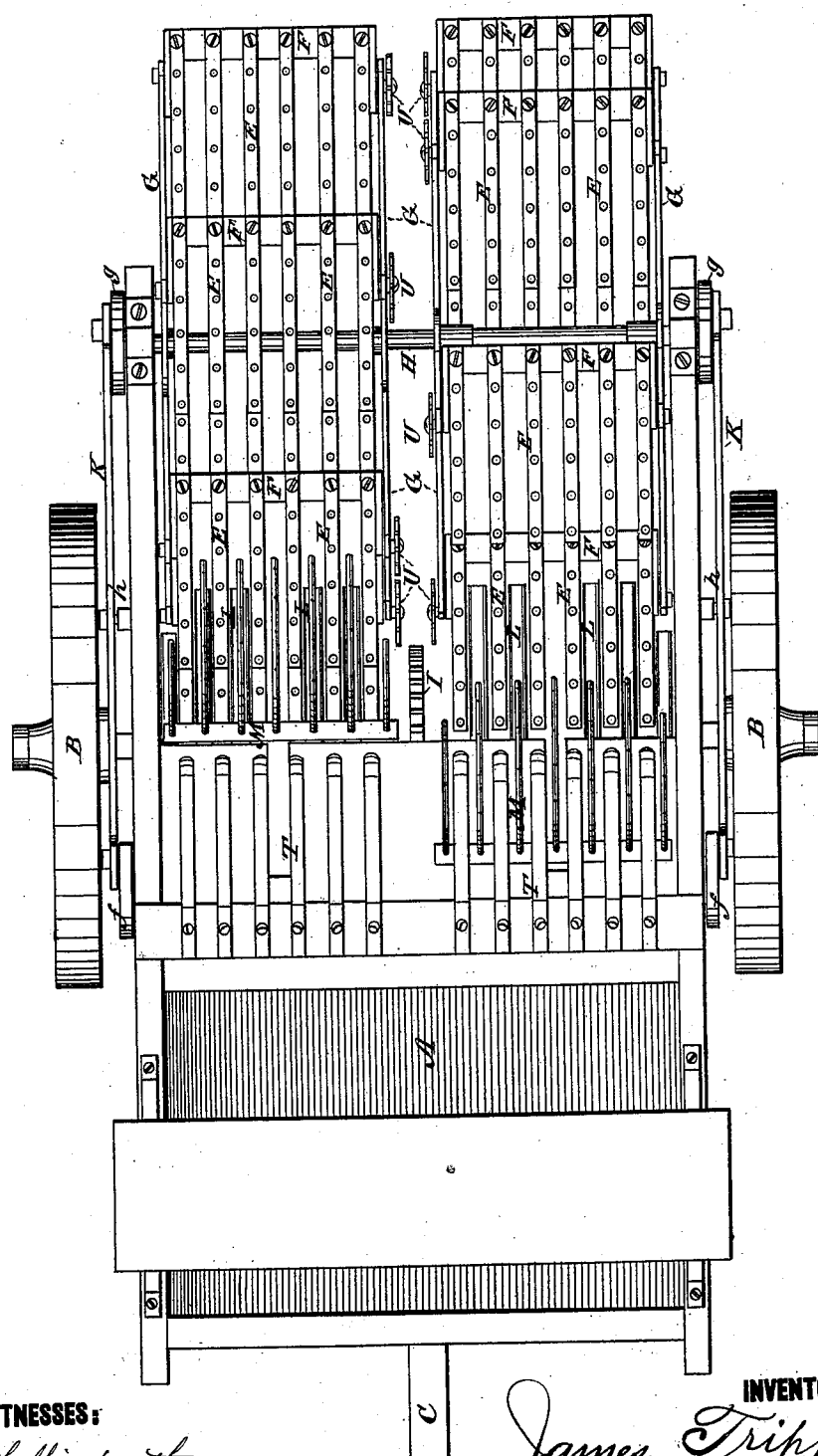
WITNESSES:
W. W. Hollingsworth
Edw. W. Byrn
INVENTOR:
James Tripp
BY
ATTORNEYS.

3 Sheets—Sheet 3
J. TRIPP.
Cotton-Harvester.
No. 200,362. Patented Feb. 12, 1878.
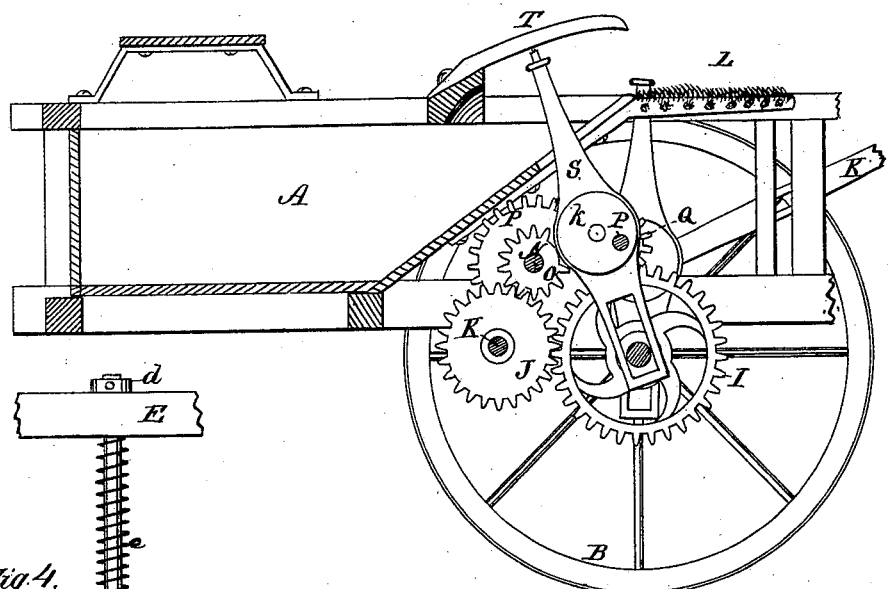
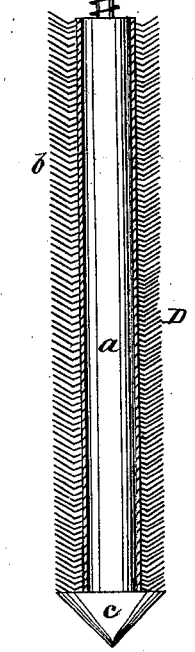
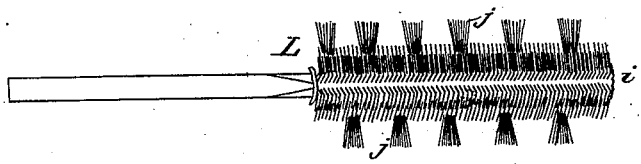
WITNESSES:
W. W. Hollingworth
Edw. W. Byrn
INVENTOR:
James Tripp
BY
ATTORNEYS.
N. PETERS, PHOTO-LITHOGRAPHER, WASHINGTON, D.C.

UNITED STATES PATENT OFFICE.

JAMES TRIPP, OF COLDWATER, MICHIGAN.

IMPROVEMENT IN COTTON-HARVESTERS.

Specification forming part of Letters Patent No. 200,362, dated February 12, 1878; application filed November 14, 1877.

*To all whom it may concern:*

Be it known that I, JAMES TRIPP, of Coldwater, in the county of Branch and State of Michigan, have invented a new and Improved Cotton-Harvester; and I do hereby declare that the following is a full, clear, and exact description of the same, reference being had to the accompanying drawings, forming part of this specification, in which—

Figure 1 is a side elevation; Fig. 2, a plan view; Fig. 3, a partial vertical longitudinal section, showing driving mechanism; Fig. 4, a detail of one of the pickers, with the card-cloth in longitudinal section; and Fig. 5, a top view of a portion of one of the receiving-bars.

The object of my invention is to provide a practical device for picking or harvesting cotton in the field, and thus dispense with the slow, laborious, and expensive mode of picking by hand, as commonly practiced.

The invention covers a number of improvements upon that form of cotton-harvester in which a set of pendent pickers, composed of bars surrounded by upwardly-pointing teeth, is arranged to revolve, and in said revolution to descend into the cotton-bush and seize the fiber, and then, with a motion to the rear, to compensate for the progressive movement of the device, to ascend and deliver the fiber to a set of strippers.

In the drawings, A represents the box or receptacle for the picked cotton, which receptacle is arranged in the forward part of a frame similar to a wagon-body frame. Said frame is mounted upon running wheels B B, and is provided with a tongue or pole, C, with suitable draft-connections. The back of the cotton-receptacle is inclined upwardly and rearwardly, while the side frames are extended to the rear, past the supporting wheels, to form supports for and carry the cotton-picking devices.

D are the pickers, which are constructed each exactly alike, as shown in Fig. 4, with a stiff straight central bar, *a*, of hard wood or iron, about thirty-six inches in length, or of a length adapted to the size of the bushes. These bars have their lower portions, throughout the greater part of their length, covered with a surface of upwardly-projecting spines or teeth, *b*. For forming these teeth I employ a straight piece of card-cloth, and instead of cutting it in a narrow strip and winding it spirally about the rod, as has been heretofore done, I form the straight piece of card-cloth into a tube, and fasten it then upon the rod.

The object of this mode of applying the card-cloth is to have the wire teeth always pointing upward, and, as the teeth are bent or crooked all in the same direction, it is obvious that they must be applied in the whole piece to secure this result, as the spiral arrangement of strips would cause the natural inclination of the teeth to point in various directions.

To cause the pickers to enter the bush without obstruction, and to take up wear, I attach to the end of the rod *a* a conical pointed foot, *c*, made of wood or iron, but preferably of the latter material, and secured by a screw, or in any other suitable way. This pointed foot, it will be seen, causes the picker in descending to glance off from opposing limbs, and preserves the lower portion of the card-teeth from injury and wear. To prevent the breakage of the pickers also, in passing over stones, stumps, or other similar obstruction, it is desirable that the pickers should be yielding or receding in character, and for this reason I pass the central rod *a* of the picker entirely through its horizontal supporting-bar E, and fix upon the end of the same a head or collar, *d*, while beneath the supporting-bar, and between the same and a shoulder on the central rod, I arrange a spiral spring, *e*, which allows the pickers to move up through the supporting-bar against the tension of the spring, thus making the picker-spring seated and yielding to obstructions.

In fixing the pickers in sets and series of sets in the machine, I arrange a number of the pickers in a horizontal supporting-bar sufficiently far apart to allow the limbs of the cotton-bush and green bolls to pass between the same, and these horizontal bars I arrange in sets, Figs. 1 and 2, and connected at one end only (for reasons hereinafter explained) by a cross-bar, F. Of these sets of pickers I employ a series, 1 2 3 4 5 6, and pivot them each so that the pickers hang vertically between the projecting radial arms G of a reel-frame fastened rigidly upon the horizontal transverse shaft H. This shaft is journaled in bearings in the rear end of the wagon-frame, and carries two such reel-frames with series of sets of pickers, so as to harvest two rows of cotton at once.

In imparting rotary motion to the reel-frames the supporting-wheels are rigidly fastened to their axle, and to the latter is keyed a gear-wheel, I, Fig. 3, which meshes into a gear-wheel, J, keyed upon a second shaft, K. This latter shaft is arranged parallel to and in front of the axle, and is journaled in bearings beneath the wagon-frame. Upon its extremities, outside of its bearings, are fixed disks $f$, one upon each side of the machine. These disks are connected by means of wrist-pins with a rigid lever-pitman, K, upon each side, which latter are loosely connected, by slots and pins, with disks $g$ keyed upon opposite extremities of the reel-frame shaft.

Now, as the shaft K revolves its wrist-pins impart a reciprocating movement to the lever-pitmen K, which is converted at the opposite end of the pitmen into a uniform rotary movement of the reel-shaft by means of the intermediate slot and fixed fulcrum-pin $h$, the opposite ends of each of the lever-pitmen rotating with an opposite revolution about their respective shafts. This means of transmitting rotary motion to the series of pickers on the reel-frame is simple, strong, and not liable to become entangled with or disarranged by the bushes of the plant. I may, however, if desired, employ in the place of this device a chain-belt with wheels, or other equivalent mechanism for this purpose.

In connecting the drive-wheels and the reel-frame, the series of pickers on the latter and the intervening gear-wheels are so relatively arranged as to cause the sets of pickers to follow each other in immediate succession without leaving upon the row of cotton any unpicked spaces, so that no portions of the cotton row are skipped.

In the arrangement of the sets of pickers in the reel-frame, it will be seen that the only connection they have therewith is through their pivots, and hence for all parts of their revolution they are in a state of suspension, which well adapts them to the vertical longitudinal movement required.

To prevent the swinging or swaying, however, of the several seats, which would interfere with the proper working of the device, I connect rigidly with the pivot-extension of each set of pickers a rag-wheel, U, and around all of these rag-wheels, upon their respective sets of pickers, I pass a chain-belt, V, Fig. 1. This arrangement allows the gravity of the pickers always to preserve their true pendent and vertical position, and yet, by connecting them all, prevents any swaying or independent motion of any one set, and causes them to act uniformly and smoothly.

With this arrangement of cotton-harvester, as so far described, it will be seen that the merit lies in the certain and easy entrance of the pickers into the row of cotton, the fact that the pickers descend and rise together without the objectionable rubbing action, and the fact that the pickers enter the cotton-bush and rise therefrom over the same spot by the compensating movement to the rear effected by locating the pickers on a revolving reel-frame, which, it will be seen, prevents them from being dragged laterally through the bush, to the injury of the plant as well as to the damage of the pickers and the cotton.

Now, as the sets of the series of pickers successively descend into the cotton-bush and rise with the cotton held by the card-teeth they pass upwardly and around toward a series of stripping-bars, L, Figs. 1, 2, 3, and 5. These bars are affixed to the rear inclined side of the box or receptacle for the cotton, and are covered upon their upper edges with card-cloth $i$, Fig. 5, the teeth of which incline toward the said box, while upon the sides of said bars are arranged laterally-projecting brushes $j$. Now, the supporting-bars E being parallel and open, and connected at their rear ends only by a cross-bar, F, they pass down freely between the stripping-bars L, Fig. 2, and as they thus pass down the card-cloth on the same seizes the fiber of the cotton, while the brushes $j$, by reaching laterally through the pickers, serve more effectually to clear the cotton from the points of the pickers, which are somewhat removed from the card-cloth of the stripping-bars.

The cotton being thus delivered from the pickers to the stripping-bars, a rake, M, by a compound movement, carries it back into the box. This rake is formed of a head, having bent arms arranged parallel with the stripping-bars and provided each with downwardly-projecting teeth. In imparting motion to this rake a shaft, N, is arranged in bearings parallel with K, and provided with a pinion, O, which meshes with the gear-wheel of shaft K. A larger gear-wheel, P, is keyed upon this same shaft for a spur-gear or multiple revolution, and this wheel, in turn, meshes with a pinion, Q, fixed upon a third shaft, P. This latter shaft is provided with two eccentrics, $k\ k$, which revolve in circular openings in the bars S, which latter are attached to and operate the rakes. These eccentrics impart the necessary movement to the rakes, and the spur-gears driving the same are so regulated in number and relation of teeth as to cause the rakes to pass over the stripping-bars once for each delivery of cotton to the stripping-bars by the several sets of pickers, the movement of the rake being so timed as to cause it to pass over the stripping-bars just as the carded portion of the pickers has passed below them. To give the rakes a compound or natural raking movement, the lower ends of these bars S are slotted, (see Fig. 3,) and made to embrace the axle of the driving-wheels, so as to be controlled thereby to the desired result.

To permit the backward movement of the rakes, the inclined rear portion of the box is slotted to receive the rake-bars S, and as the rakes pass over said inclined back with their charge of cotton they are cleared of their burden by means of a set of stationary clearing-fingers, T, through which the parallel bars of the rakes rise in their compound movement, and by which the cotton is pulled off from the teeth of the latter and allowed to drop into the box or receptacle for the same.

I do not claim, broadly, a set of pivoted pendent pickets having a revolving motion to the rear, as this principle is embodied in the harvester patented December 11, 1860, by Apperley and Johnson, in which the set of pickers is pivoted upon a crank-axle. This arrangement, however, admits the use of only one set of pickers, and to enable the single set to pick the row without leaving spaces it must have a motion so rapid as to involve the lateral abrasion of the bushes. I therefore limit my claim as to this feature to the pickers arranged in series of sets, and combined with the reel-arms, which permits the pickers to pick the row without leaving spaces, and yet to have a retrograde motion, which more nearly corresponds in uniformity to the advance movement of the machine, and which, therefore, diminishes lateral abrasion of the pickers in the bush.

Having thus described my invention, what I claim as new is—

1. A vertically-operating cotton-picker, D, having upwardly-projecting spines or card-teeth, made inflexible or rigid against lateral bending, but arranged to yield in longitudinal direction, substantially as described.

2. The pointed foot c, arranged upon the lower extremity, and combined with the vertically-operating picker carrying upwardly-projecting teeth, substantially as and for the purpose described.

3. The combination, with the series of sets of pickers, of a rag-wheel arranged upon the pivot of each set of pickers, and an endless chain encircling all the rag-wheels of said series, for the purpose of preventing the individual swaying movement of the sets, substantially as described.

4. A series of sets of pendent and vertically-operating pickers, combined with and pivoted to the reel-arms G, arranged upon a revolving axis, substantially as and for the purpose described.

5. The combination, with the reel-frame, carrying the sets of pickers and provided with disks g, of the lever-pitman K, connected with the crank-pin of its driving-shaft, and having an intermediate fulcrum, substantially as shown and described.

6. The strippers L arranged upon the rear portion of the cotton-receptacle, and having forwardly-inclined card-teeth i and laterally-projecting brushes j, in combination with the revolving sets of pickers, substantially as shown and described.

7. The combination, with a set of parallel rearwardly-projecting strippers, L, of a set of pickers, D, arranged in open parallel bars E, having a single cross-bar, F, to adapt the pickers to pass through and deliver their burden to the strippers, substantially as described.

8. The rake M, in combination with the strippers L, the receptacle A, and the clearing-fingers T, substantially as and for the purpose described.

9. The combination, with the shaft R, carrying eccentric k, of the rake M, having its bar S slotted and embracing the axle of the driving-wheels, to secure and control the compound movement of said rake, substantially as described.

10. A cotton-picking device consisting of a set of revolving pendent pickers, a set of strippers, a rake, and clearing-fingers, substantially as shown and described.

The above specification of my invention signed by me this 9th day of November, 1877.

JAMES TRIPP.

Witnesses:
  EDW. W. BYRN,
  SOLON C. KEMON.